(12) United States Patent
Shevtsov

(10) Patent No.: US 8,047,508 B2
(45) Date of Patent: Nov. 1, 2011

(54) COOLING TOWER

(76) Inventor: Aleksandr Vasilievich Shevtsov, Volzhsky (RU)

( * ) Notice: Subject to any disclaimer, the term of this patent is extended or adjusted under 35 U.S.C. 154(b) by 517 days.

(21) Appl. No.: 12/304,174

(22) PCT Filed: Aug. 1, 2007

(86) PCT No.: PCT/RU2007/000417
§ 371 (c)(1),
(2), (4) Date: Dec. 10, 2008

(87) PCT Pub. No.: WO2008/024025
PCT Pub. Date: Feb. 28, 2008

(65) Prior Publication Data
US 2009/0199584 A1 Aug. 13, 2009

(30) Foreign Application Priority Data

Aug. 3, 2006 (RU) .................. 2006128305

(51) Int. Cl.
*B01F 3/04* (2006.01)

(52) U.S. Cl. ............. 261/22; 261/29; 261/78.2; 261/98; 261/118; 261/DIG. 11

(58) Field of Classification Search .......... 261/18.1, 261/22, 29, 36.1, 78.2, 98, 99, 117, 118, 261/DIG. 11
See application file for complete search history.

(56) References Cited

U.S. PATENT DOCUMENTS

| 4,217,317 | A | * | 8/1980 | Neu ............................... 261/160 |
| 4,337,216 | A | * | 6/1982 | Korsell ....................... 261/112.2 |
| 4,367,183 | A | * | 1/1983 | Carbonaro .................... 261/159 |
| 2002/0047219 | A1 | * | 4/2002 | Menzel et al. ............... 261/109 |
| 2008/0079179 | A1 | * | 4/2008 | Lundgreen et al. .......... 261/79.2 |

FOREIGN PATENT DOCUMENTS

| FR | 2228208 | 11/1974 |
| RU | 2153137 | 7/2000 |
| RU | 2272977 | 3/2006 |
| SU | 1158845 | 5/1985 |
| SU | 1404782 | 6/1988 |
| SU | 1513364 | 10/1989 |

OTHER PUBLICATIONS

English abstract of SU1404782. (1 page), 1986.
English abstract of RU2272977. (1 page), 2006.
FR2228208 is also U.S. Patent No. 3,865,911. (5 pages), Feb. 1975.

\* cited by examiner

*Primary Examiner* — Charles Bushey
(74) *Attorney, Agent, or Firm* — Rader, Fishman & Grauer PLLC

(57) ABSTRACT

A cooling tower comprises a body provided with air-intake windows located above a catch basin, and a water distributor, which has a sprinkler, and an irrigators. Ring tubular units are connected to each other to form a ring-type evaporator fed from a pipeline, which is used for water supply from a water source independent of the water distributor, and are vertically arranged in the apertures of the air-intake windows. Equally spaced atomizing sprayers are mounted on each of the tubular units along the circumference of the unit. The invention makes it possible to enhance the operational performance of the cooling tower in a hot environment by improving operating, service and maintenance conditions.

1 Claim, 3 Drawing Sheets

COOLING TOWER

CROSS-REFERENCES TO RELATED APPLICATION

This application is a National Stage application which claims the benefit of International Application No. PCT/RU2007/000417 filed Aug. 1, 2007, which claims priority based on Russian Patent Application No. 2006128305, filed Aug. 3, 2006, all of which are hereby incorporated by reference in their entirety.

The invention relates to thermal power system, in particular to such heat exchange plants as cooling towers, and can be used for cooling circulating water at electric power stations, and in chemical and petroleum-refining industry.

Known are cooling towers (see Berman L. D. "Evaporative cooling of circulating water." M.: Gosenergoizdat, 1957), comprising a body with air-intake windows in a lower part of the body and a water distributor and a sprinkler mounted in an upper part thereof.

Also known is a blowing cooling tower disclosed in the USSR Author's Certificate No 1404782, F 28 C 1/00, 1986. Installed in the body of the cooling tower equipped with air-intake windows are a water catch and an irrigator that has at least two stages arranged in tiers. A main water distributor with sprinklers is placed above the top stage An additional water distributor placed under the top stage is connected with the main water distributor by a pipeline. The additional water distributor is also equipped with sprinklers directed to the top stage of the irrigator. The water to be cooled is supplied to the main and additional water distributors. Spraying the top stage of the irrigator is performed by the sprinklers of the both water distributors. Cooperating with a stream of ascending air, water flows down on the lower stage of the irrigator and then into a catch basin.

The construction of the known cooling towers is conducive in one way or another to the intensification of heat and mass exchange basically due to increasing a surface of heat exchange through improving the air distribution inside the cooling tower or water. However, as it follows from the results of perusing the state of art by the inventor, the problem of water cooling during the summer period in hot climate conditions with the ambient air temperature reaching more than 30° C. (87° F.) still has not been solved. If the temperature of circulating water being delivered to the cooling tower for cooling is of about 35-40° C. (95-104° F.), and the temperature of the air being supplied for cooling the water is about the same, the cooling tower becomes inefficient.

A cooling tower whose structure is considered a prototype (the prior art closest to the invention) is disclosed in the Russian patent 2272977, F28C 1/00, F28B 5/00, 2006. It comprises a body with air-intake windows, an irrigator, and a water distributor with a sprinkler. Mounted in an inner space of the cooling tower is an evaporator connected to a cold water supply and having tubular units made as rings horizontally suspended to a rope sheave system mounted under the irrigator. The evaporator tubular units are placed over the whole area of the cooling tower cross-section. Spaced equidistantly around the periphery of each of the tubular units are atomizing sprayers, nozzles of which are directed toward the air stream coming into the cooling tower.

The use of the known cooling tower makes evident its inconvenience in maintenance. The presence of salts and impurities in hot water falling on the sprayers contributes to clogging the sprayers' nozzles rendering the evaporating system inoperative. Furthermore, metallic sprayers get oxidized in operation by the action of hot water and fall in efficiency, which results in having to replace them. Servicing the sprayers is only possible when using special equipment and scaffolding. Since the evaporation system of the known cooling tower is located under the irrigator, and hot water is supplied to the irrigator's surface in operation, the operation of the whole cooling tower has to be stopped on scheduled maintenance shut-downs. Under hot climate conditions, the effectiveness of the cooling tower operation is influenced by the following factor. Saturated vapor is known to be a limit in saturating air with moisture, therefore, because of high moisture inside the cooling tower, its resources for cooling air are moderate. Yet, the air being positively cooled due to the evaporator installed in the cooling tower, has substantially high temperature. An inadequate cooling of the air inside the cooling tower owes to the fact that hot water mixing with the air contributes to its humidity, and the higher humidity of the air, the less moisture can be evaporated in such an air.

The object of the invention and the technical result expected is enhancing the efficiency of cooling tower operation under conditions of hot climate through improving maintenance, servicing and repair.

The above-mentioned result is accomplished in a known cooling power comprising a body with air-intake windows, a water distributing collector with a sprinkler, and an evaporator, which is connected to an independent water supply and is provided with ring tubular units, which have atomizing sprayers spaced equidistantly along the circumference of the tubular units, by implementing the evaporator as a ring-type system, in which vertically suspended tubular units are mounted in the air-intake windows.

The technical solution allows enhancing the efficiency of the cooling tower under conditions of hot climate due to creation of forced cooling in air-intake window apertures for the air coming into the cooling tower. Hot outside air is less humid when compared with the air inside the cooling tower. Accordingly, larger amount of water can be evaporated in such air to cool it. In other words, as a result of mounting a sprinkler system at the level of the air-intake window apertures, a possibility has evolved to increase the ability of the air to be cooled due to evaporating the moisture created by the sprayers atomizing water at the entrance of the cooling tower. In comparison with the prototype, the invention allows to separate the air cooling process from the circulating water cooling process. First, due to creating a fog-shaping screen at the entrance of the cooling tower by sprayers atomizing water, the maximum possible cooling of the hot air entering the cooling tower that can be obtained as a result of evaporating the foggy moisture is achieved. Then, inside the cooling tower, the cooling of the circulating water results from evaporating hot moisture contacting with incoming flow of air cooled at the entrance of the cooling tower.

In this way, higher efficiency of the cooling tower operation under hot climate conditions is secured. Through mounting the system of evaporative tubular unit outwardly, the proposed solution makes it possible to access the sprayers intended for atomizing cold water and to thus simplify maintenance of the cooling tower. Additionally, the ring-type evaporative system with an outward placement of the tubular units made as rings allows to maintain and repair sprayers of one of the units without turning off the whole system, as well as without bringing the cooling tower to a halt.

The invention is elucidated by the drawings.

Figure 1:
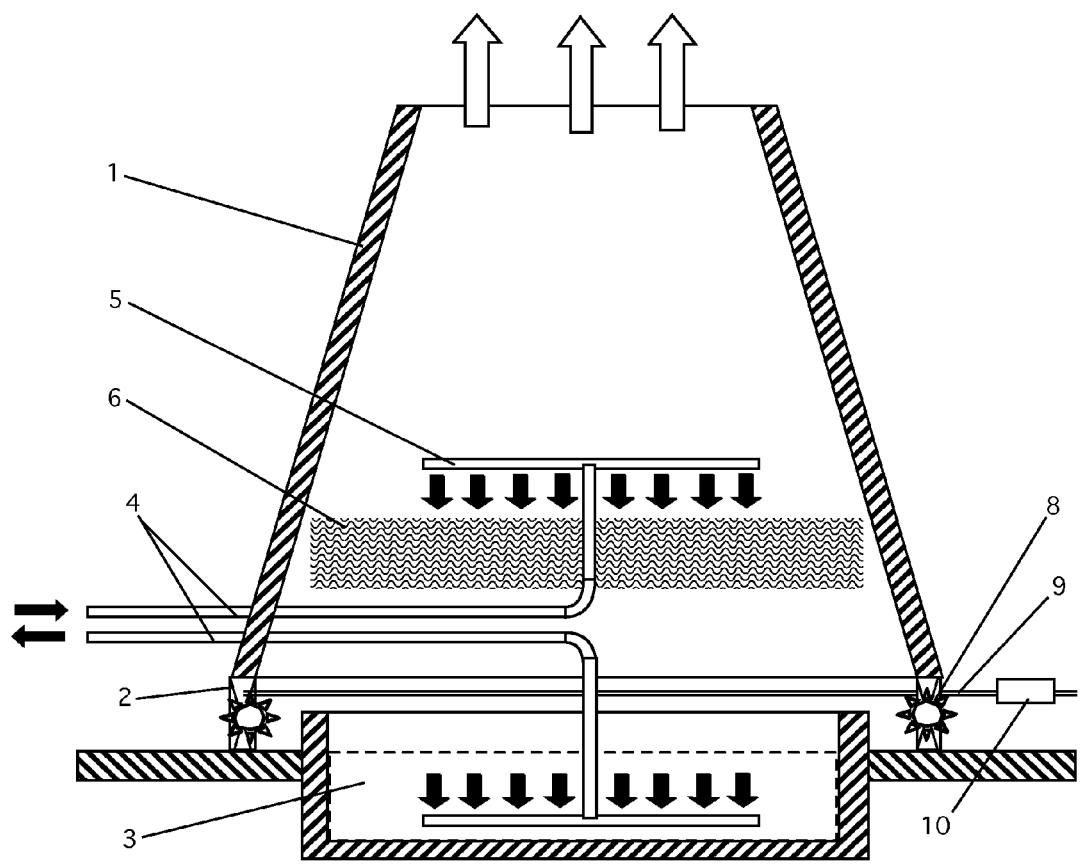
FIG. 1 shows a longitudinal cross-section of the cooling tower.
Figure 2:
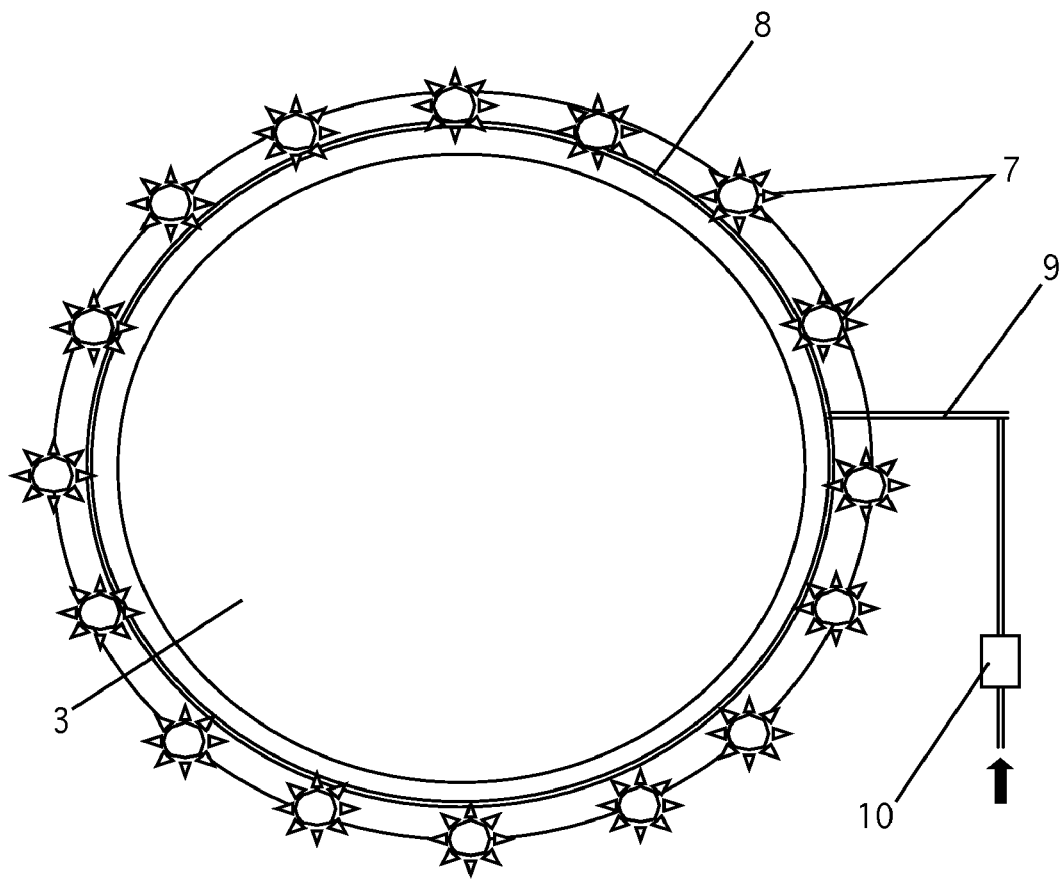
FIG. 2 illustrates how evaporating units of the cooling tower are arranged.
Figure 3:
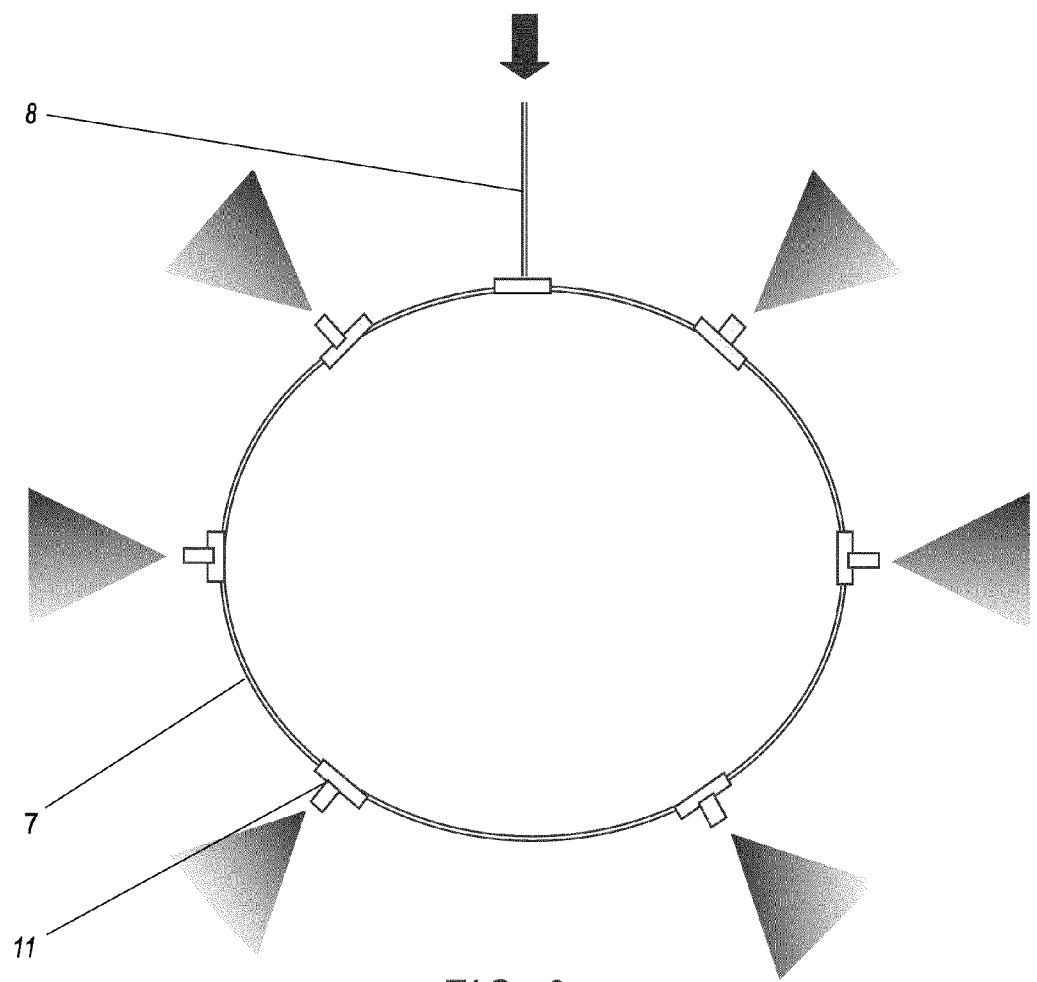
FIG. 3 shows a ring-type tubular unit of an evaporating system with atomizing sprayers of a "fog-shaping type."

The cooling tower comprises a body 1 with air-intake windows 2, a catch basin 3, a water distributor 4 with a sprinkler 5, and an irrigator 6. Outwardly, along the perimeter of the cooling tower, ring-type tubular units 7 of the evaporator 8 are suspended vertically. The tubular units are connected to a pipeline 9, which brings water from a water supply 10 independent of the water distributor 4, to form a ring evaporating system. The ring tubular units 7 of the evaporator 8 are placed in apertures of the air-intake windows 2 and are provided with atomizing sprayers 11. The sprayers 11 are equidistantly spaced along the perimeter of a ring of each tubular unit 7.

The cooling tower operates as follows. Circulating water to be cooled in the cooling tower is supplied from the water distributor 4 to the surface of the irrigator 6 by means of the sprinkler 5. Also, water under high pressure (for example, 80 atm) is fed from the independent source 10 over the pipeline 9 of the evaporating system 8 to the ring tubular units 7. Through nozzles of the sprayers 11, water is atomized in a flow of air coming into the cooling tower via the air-intake windows 2 located at a lower part of the body 1. Upon contacting the hot air with the water screen, water evaporates. Since any liquid removes energy from its environment upon evaporating, the air flow is getting cool. The circulating water supplied from the water distributor 4 to the surface of the irrigator 6 streams down to meet the air flow cooled off upon passing through the evaporator 8. Interacting with the cooled air, the circulating water in the usual fashion cools down and streams down into the catch basin 3.

The above-discussed structure of placing atomizing sprayers on the ring tubular units provides a means to make pressure even for each sprayer. If, for example, each of the ring units of the evaporation system comprises 10 sprayers, the nozzle diameter in each of them being equal to 3 mm, 184 liters of water per hour can be evaporated at the above-identified water pressure, which makes it possible to lower by 15° C. the temperature of the air passing through a given ring unit. In consequence of the operation of the whole cooling system of the cooling tower in accordance with the invention, 17 million kcal of heat per hour is being removed from air. As a result, the temperature of the air coming into the cooling tower lowers on the average by 15 degrees.

What is claimed is:

1. A cooling tower comprising:
    a body with air-intake windows,
    a water distributor with a sprinkler and an irrigator,
    a catch basin, and
    an evaporator connected to an independent water supply, made as a ring-type system and provided with ring tubular units equipped with atomizing sprayers equidistantly spaced in each of the ring tubular unit along the circumference thereof,
    the ring tubular units being vertically suspended and placed in the air-intake windows.

* * * * *